(12) United States Patent
Tomioka et al.

(10) Patent No.: US 8,864,427 B2
(45) Date of Patent: Oct. 21, 2014

(54) PROCESSING MACHINE

(75) Inventors: Masahiro Tomioka, Hamamatsu (JP);
Yoshihiro Sakurai, Hamamatsu (JP)

(73) Assignee: Roland DG Corporation,
Hamamatsu-shi (JP)

( * ) Notice: Subject to any disclaimer, the term of this patent is extended or adjusted under 35 U.S.C. 154(b) by 875 days.

(21) Appl. No.: 13/076,361

(22) Filed: Mar. 30, 2011

(65) Prior Publication Data

US 2011/0305537 A1 Dec. 15, 2011

(30) Foreign Application Priority Data

Jun. 14, 2010 (JP) ................................. 2010-135105

(51) Int. Cl.
*B23C 1/12* (2006.01)
*B23Q 1/01* (2006.01)
*B23Q 1/26* (2006.01)
*B23Q 11/08* (2006.01)
*B23C 1/00* (2006.01)

(52) U.S. Cl.
CPC .............. *B23Q 11/0891* (2013.01); *B23C 1/12* (2013.01); *B23C 1/012* (2013.01); *B23C 1/002* (2013.01); *B23Q 11/0816* (2013.01); *B23Q 1/015* (2013.01)
USPC ........... 409/235; 409/134; 409/212; 409/211; 408/237

(58) Field of Classification Search
CPC ........... B23C 1/002; B23C 1/12; B23Q 1/012
USPC ......... 409/202, 212, 235, 201, 216, 211, 134; 408/236–237
See application file for complete search history.

(56) References Cited

U.S. PATENT DOCUMENTS

| 1,991,285 | A | * | 2/1935 | Lindner | 408/236 |
| 2,948,168 | A | * | 8/1960 | McCormick | 408/236 |
| 3,835,527 | A | * | 9/1974 | Cornair | 29/560 |
| 7,185,412 | B2 | * | 3/2007 | Penick et al. | 409/212 |
| 7,255,519 | B2 | * | 8/2007 | Tanoue et al. | 409/134 |

(Continued)

FOREIGN PATENT DOCUMENTS

DE 102007015071 A1 * 10/2008
EP 1166952 A2 * 1/2002

(Continued)

OTHER PUBLICATIONS

Machine Translation of FR 2766752, which FR '752 was published Feb. 1999.*

*Primary Examiner* — Erica E Cadugan
(74) *Attorney, Agent, or Firm* — Lee, Hong, Degerman, Kang & Waimey

(57) ABSTRACT

A processing machine for cutting a workpiece with a tool is presented. The processing machine includes a base member configured to support a table for receiving the workpiece, and a tool support disposed on the base member for rotation between a vertical position and a horizontal position and configured to support the tool, wherein the tool support is formed from a right leg portion, a left leg portion, and a main portion, such that the main portion connects upper ends of the right leg portion and the left leg portion, wherein the main portion is located above the table when the tool support is in the vertical position, and wherein a space above the table is not covered by the main portion when the tool support is in the horizontal position.

22 Claims, 9 Drawing Sheets

(56) References Cited

U.S. PATENT DOCUMENTS

| | | | |
|---|---|---|---|
| 7,845,257 B2 * | 12/2010 | Kim et al. | 82/118 |
| 8,152,423 B2 * | 4/2012 | Park et al. | 409/216 |
| 8,414,233 B2 * | 4/2013 | Matsui | 409/201 |
| 2006/0228182 A1 * | 10/2006 | Pasquetto | 409/201 |
| 2011/0280680 A1 * | 11/2011 | Park et al. | 409/211 |

FOREIGN PATENT DOCUMENTS

| | | | |
|---|---|---|---|
| FR | 2661698 A | * | 11/1991 |
| FR | 2766752 A1 | * | 2/1999 |
| JP | 64-009033 U | * | 1/1989 |

* cited by examiner

- PRIOR ART -

US 8,864,427 B2

PROCESSING MACHINE

CROSS-REFERENCE TO RELATED APPLICATIONS

Pursuant to 35 U.S.C. §119(a), this application claims the benefit of the earlier filing date and right of priority to Japanese Application No. 2010-135105, filed on Jun. 14, 2010, the contents of which are hereby incorporated by reference herein in its entirety.

BACKGROUND OF THE INVENTION

1. Field of the Invention

The present invention is related to a processing machine, and more specifically, to a processing machine suitable for cutting a workpiece using a tool.

2. Discussion of the Related Art

A conventional processing machine performs a processing operation, such as cutting, on a workpiece using a tool, such as a cutter or an endmill.

FIGS. 1(a) and 1(b) illustrate a processing machine of the prior art. As illustrated in FIG. 1, a processing machine 100 includes a base member 106 for supporting a table 104 which receives a workpiece 102. Side members 108a and 108b extend upward from the side ends of the base member 106. A rear member 110 extends upward from a rear part of the base member 106 and connects the side members 108a and 108b. Additionally, the processing machine 100 includes a pair of guide rails 112, a head portion 114 slidably mounted on the guide rails for supporting a tool 122 for use in cutting the workpiece 102, an upper member 116 disposed on upper ends of the rear member 110 and the side members 108a and 108b, an inclined member 118 disposed in front of the upper member 116 for rotation about a Y-axis in an XYZ-orthogonal coordinate system, and a front member 120 disposed in front of the base member 106 for rotation about a Y-axis.

More specifically, the base member 106, the side members 108a and 108b, the rear member 110, the upper member 116, the inclined member 118, and the front member 120 define a space within the processing machine 100. The inclined member 118 and the front member 120 are made of a transparent material.

The space formed in the processing machine 100 can be accessed by lifting the inclined member 118 in the direction of arrow D and pulling the front member 120 in the direction of arrow E. Access to the space of the processing machine 100 allows for the workpiece to be placed on the table 104 or the tool 122 to be placed on the head portion 114. The head portion 114 includes a movable member 114a slidably mounted on the guide rails 112, a second movable member 114b mounted on the movable member 114a, and a main spindle unit 114c mounted on the second movable member 114b for supporting the tool 122. The second moveable member 114b may be moved up and down.

Specifically, the movable member 114a includes a movable portion 114a-1 slidably mounted on the guide rails 112 and an upright portion 114a-2 mounted on the movable portion 114a-1 and extending upward therefrom in the Z-direction. A drive means (not shown), such as a motor, for sliding the movable portion 114a-1 along the guide rails 112 is disposed in the upright portion 114a-2.

Also, the second movable member 114b includes a pair of guide rails 114b-1 located on the movable portion 114a-1 of the movable member 114a and extending upward therefrom in the Z-direction (only one of the paired guide rails 114b-1 is shown in FIGS. 1(a) and (b)). The second moveable member 114b also includes a movable portion 114b-2 slidably mounted on the guide rails 114b-1. A drive means (not shown), such as a motor, for sliding the movable portion 114b-2 along the guide rails 114b-1 is disposed in the movable portion 114b-2.

In addition, the main spindle unit 114c includes a main spindle head 114c-1 for supporting a tool, and a main spindle 114c-2 located under the movable portion 114b-2 of the second movable member 114b. The main spindle unit 114c also includes a drive means (not shown), such as a motor, for rotating the tool 122 supported by the main spindle head 114c-1. The overall operation of the processing machine 100 is controlled by a control part which includes a microcomputer (not shown).

In the above configuration, in order to cut the workpiece 102 with the processing machine 100, the operator opens the processing machine 100 and then attaches the tool 122 to the main spindle unit 114c and places the workpiece 102 on the table 104. Next, the operator closes the processing machine 100 and inputs cutting data via the control part (not shown).

The table 104 moves in the X-direction, the movable member 114a moves in the Y-direction, and the second movable member 114b moves in the Z-direction, according to the cutting data input into the processing machine 100. As a result, three-dimensional processing may be performed on the workpiece 102 via the tool 122 being controlled by the control part.

In the prior art processing machine, the main spindle 114c-2 of the main spindle unit 114c is fixed in a vertical direction. Accordingly, it becomes difficult for the operator to attach the tool 122 to the main spindle head 114c-1 and the time to change tools may be cumbersome.

It is useful to provide a processing machine in which tools can be easily changed.

SUMMARY

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a processing machine for cutting a workpiece with a tool is presented. The processing machine includes a base member configured to support a table for receiving the workpiece, and a tool support means disposed on the base member for rotation between a vertical position and a horizontal position and configured to support the tool, wherein the tool support means is formed from a right leg portion, a left leg portion, and a main portion, such that the main portion connects upper ends of the right leg portion and the left leg portion, wherein the main portion is located above the table when the tool support means is in the vertical position, and wherein a space above the table is not covered by the main portion when the tool support means is in the horizontal position.

According to one feature, the table is configured to be movable in an X-direction of an XYZ-orthogonal coordinate system, wherein the tool is supported by the tool support means for movement in a Y-direction and a Z-direction, and wherein the tool support means is disposed such that the right leg portion and the left leg portion are disposed in contact with opposite side faces of the base member. Furthermore, the processing machine further includes a right side member and a left side member provided on opposite side faces of the base member for rotation between a vertical position and a horizontal position. Additionally, the right side member and the left side member are provided on the side faces of the base member with which the, respective, right leg portion and the left leg portion of the tool support means are disposed.

According to another feature, the right side member and the left side member are foldable.

According to yet another feature, the right side member and the left side member are removably attached to the base member.

According to still yet another feature, the processing machine further includes comprising a pair of cover members attachable to and removable from side faces of the base member which are opposite from the side faces on which the right side member and the left side member are disposed.

According to one feature, the processing machine further includes a fixing member provided on the base member for rotation between a vertical position and a horizontal position for maintaining the tool support means when the tool support means is in the vertical position.

According to another feature, the fixing member is rotatably attached to the base member by a ring portion formed at a lower end thereof and has a protrusion formed at an upper end thereof and engageable with one of the right leg portion or the left leg portion to maintain the tool support means when the tool support means is in the vertical position.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
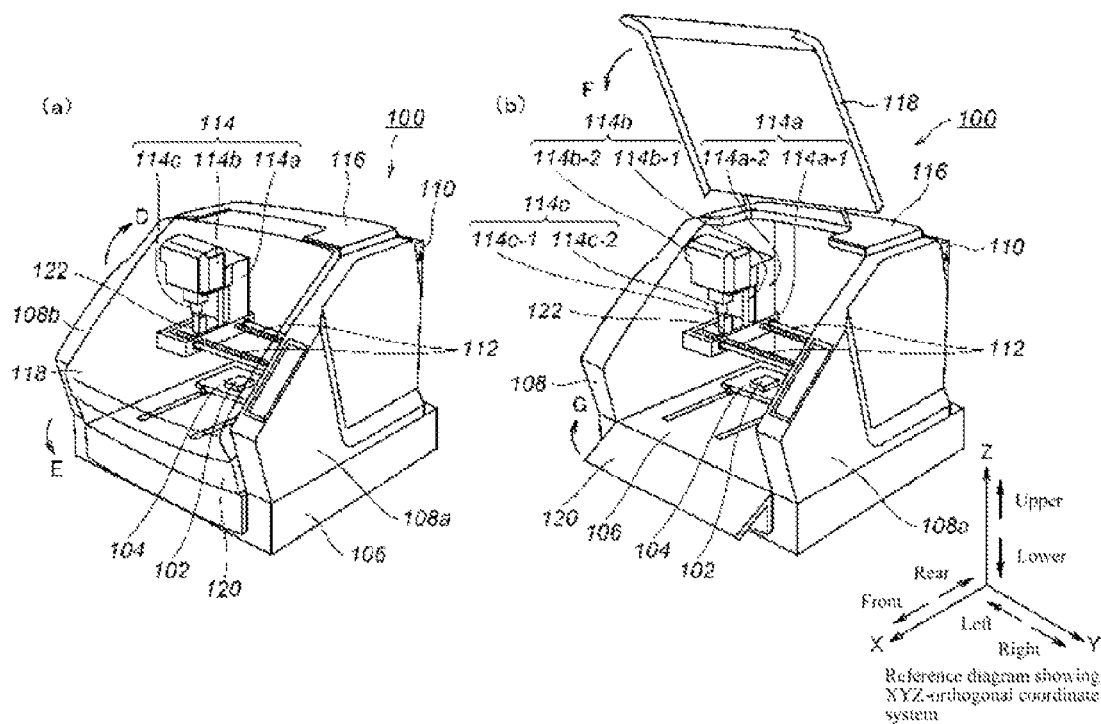
FIG. 1 illustrates a processing machine according to the prior art.

It should be noted that in the following description, components which are the same as or corresponding to those of a processing machine according to the prior art which was descried with reference to FIGS. 1(a) and (b) are designated by the same reference numerals as used above and detailed description of their configuration and effect is omitted as appropriate.

Figure 2:
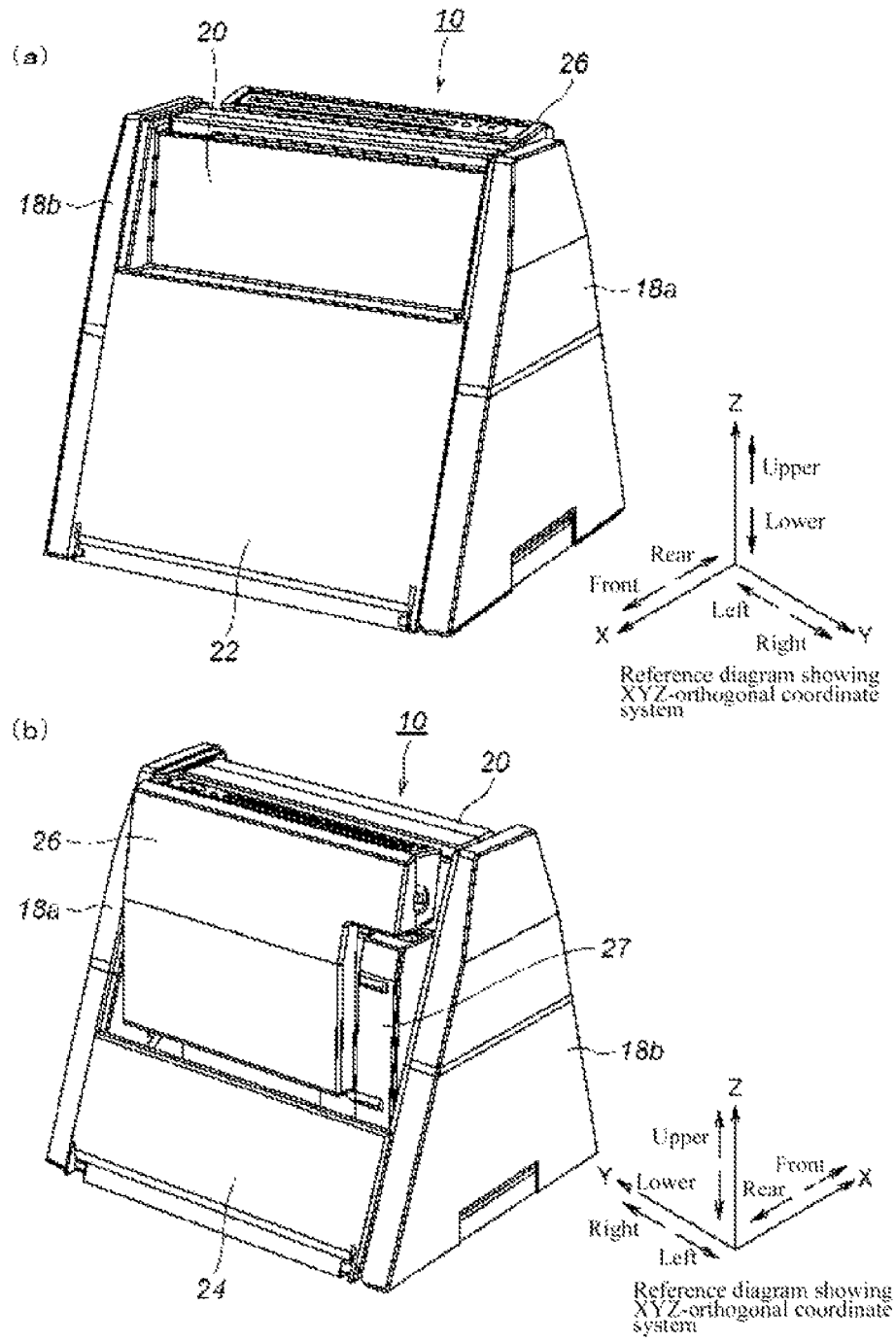
FIG. 2 to FIG. 6 illustrate a processing machine according to an embodiment of the present invention.
Figure 3:
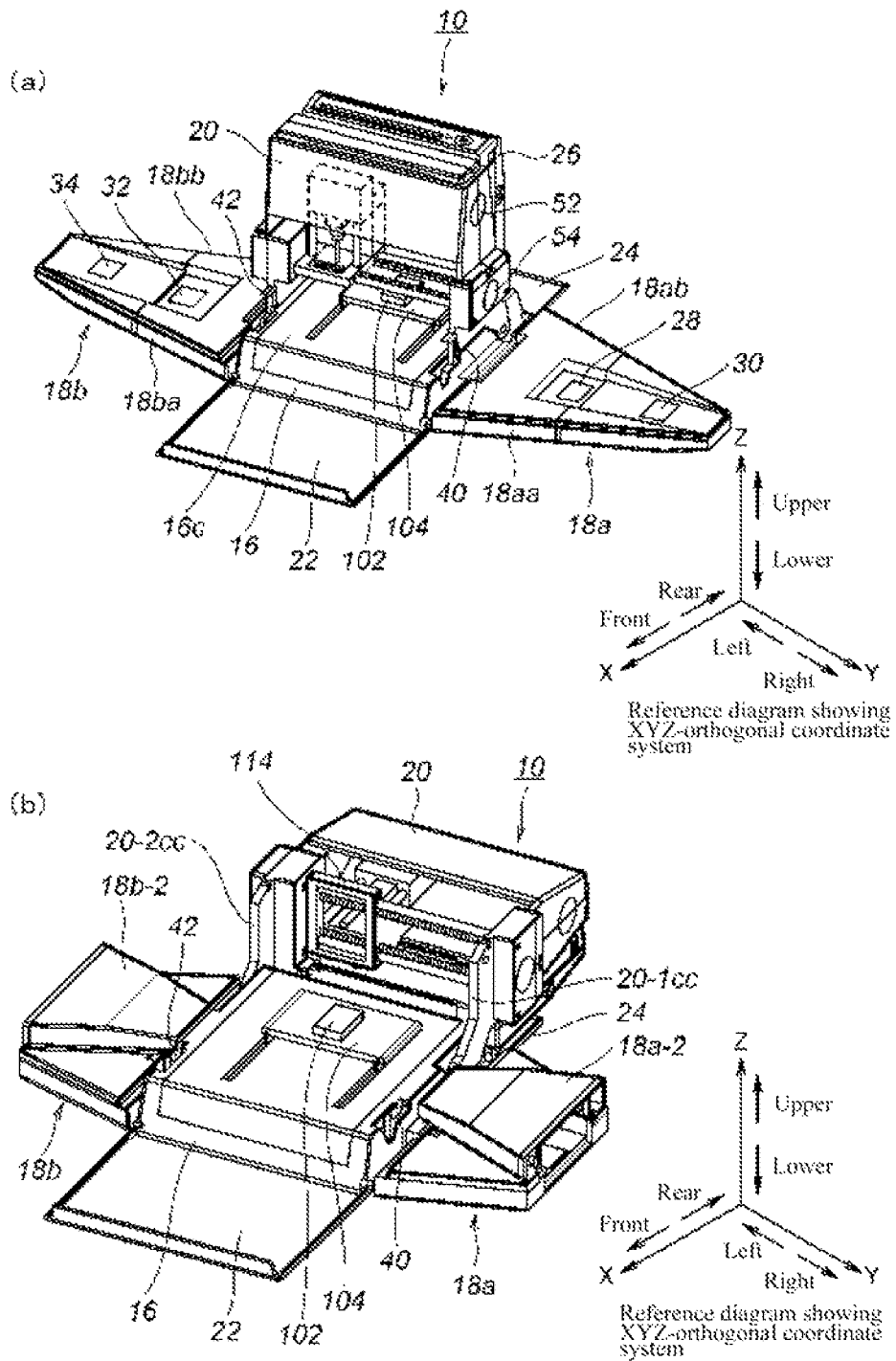

FIGS. 2 and 3 illustrate a processing machine according to an embodiment of the present invention. As illustrated in FIG. 3, a processing machine 10 may include a base member 16 for supporting a table 104 configured to receive a workpiece 102 thereon and movable in an X-direction of an XYZ-orthogonal coordinate system. The processing machine 10 may also include side members 18a and 18b rotatably and removably attached to both right and left sides of the base member 16. The processing machine 10 may further include a head portion accommodating member 20 for accommodating a head portion 114 which supports a tool 122 and moves the tool 122 in the Z-direction and Y-direction. The head portion accommodating member 20 may be rotatably attached to the base member 16. Finally, a front cover member 22 may be rotatably and removably attached to a front part of the base member 16, and a rear cover member 24 may be rotatably and removably attached to a rear part of the base member 16.

The overall operation of the processing machine 10 is controlled by a control part 26 including a control device such as a microcomputer.

The processing machine 10 performs a cutting operation on the workpiece 102, when the side members 18a and 18b, the head portion accommodating member 20, the front cover member 22, and the rear cover member 24 are standing around the base member 16 as illustrated in FIGS. 2(a) and 2(b). In the following description, the state where the side members 18a and 18b, the head portion accommodating member 20, the front cover member 22 and the rear cover member 24 stand around the base member 16, as illustrated in FIGS. 2(a) and 2(b), will sometimes be referred to as a "usage state."

In addition, the processing machine 10 may be in an "open state" when the side members 18a and 18b, the head portion accommodating member 20, the front cover member 22, and the rear cover member 24 are placed in a horizontal position (See FIGS. 3(a) and 3(b)).

Figure 4:
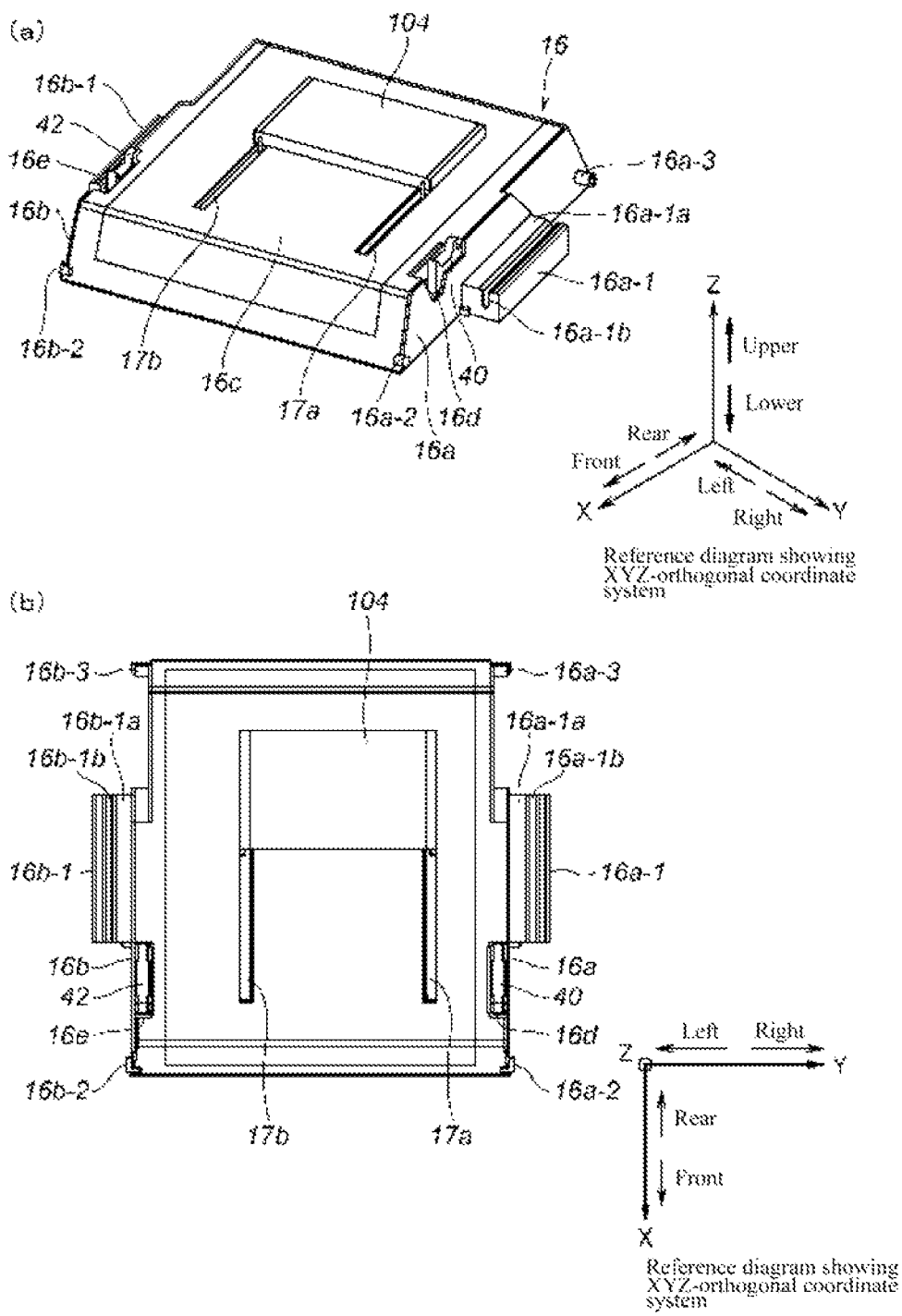

FIG. 4 illustrates a configuration of the base member according to an embodiment of the present invention.

As illustrated in FIG. 4, the base member 16 has a generally rectangular solid shape and includes a table 104 adapted to receive the workpiece 102 thereon. The table 104 is movable in the X-direction. Furthermore, a fixing member 40 may be accommodated in a recess 16d formed in a top face 16c of the base member 16 at a front part of a right side face 16a thereof. Moreover, a fixing member 42 may be accommodated in a recess 16e formed in the top face 16c of the base member 16 at a front part of a left side face 16b thereof. Finally, a connecting portion 16a-1 may be provided on a generally central portion of the right side face 16a for connecting the side member 18a, and a connecting portion 16b-1 may be provided on a generally central portion of the left side face 16b for connecting the side member 18b (See FIGS. 4(a) and (b)).

In addition, as illustrated in FIG. 4, a protrusion 16a-2 is provided at a front part of the right side face 16a, and a protrusion 16a-3 is provided at a rear part of the right side face 16a. A protrusion 16b-2 is provided at a front part of the left side face 16b, and a protrusion 16b-3 is provided at a rear part of the left side face 16b. The protrusion 16a-2 and the protrusion 16b-2 are located on the same plane in the Y-axis direction, and the protrusion 16a-3 and the protrusion 16b-3 are located on the same plane in the Y-axis direction.

The table 104 is movable in the X-direction along guide grooves 17a and 17b extending in the X-direction by a movement mechanism (not shown). A conventionally known technique is used for the movement mechanism for the table 104, and therefore, the movement mechanism will not be described in detail.

The connecting portion 16a-1 has a generally rectangular solid shape, and has a top face 16a-1a having a groove 16a-1b. Additionally, the connecting portion 16b-1 has a generally rectangular solid shape and has a top face 16b-1a having a groove 16b-1b.

Figure 5:
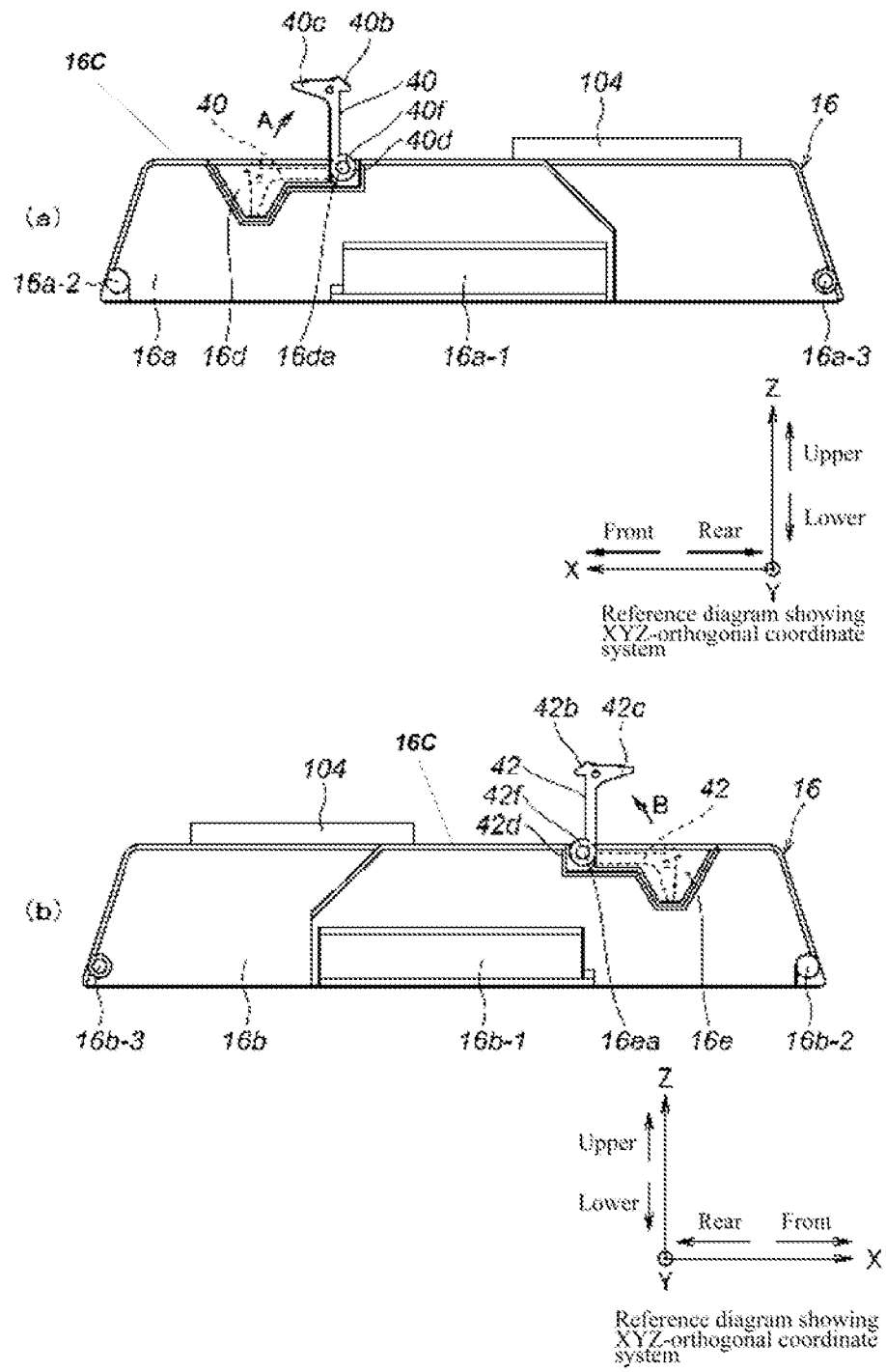

FIG. 5 illustrates a configuration of the base member according to an embodiment of the present invention.

As illustrated in FIG. 5, the fixing member 40 includes a front protrusion 40b protruding forward and a rear protrusion 40c protruding rearward at its upper end. Additionally, the fixing member 40 includes a ring portion 40d defining a hole 40f at its lower end.

A protrusion 16da protrudes to the right in the recess 16d formed at the right side face 16a in the top face 16c. The fixing member 40 is disposed for rotation around the protrusion 16da by fitting the hole 40f of the fixing member 40 over the protrusion 16da.

As illustrated in FIG. 4(a) and FIG. 5(a), the fixing member 40 is accommodated in the recess 16d when in a horizontal position, illustrated as dotted lines in FIG. 5(a), and is brought into a vertical position, illustrated as a solid line in FIG. 5(a), when rotated in the direction of arrow A around the protrusion 16da.

In addition, as illustrated in FIG. 5(b), the fixing member 42 includes a front protrusion 42b protruding forward and a rear protrusion 42c protruding rearward at its upper end. The fixing member 42 also includes a ring portion 42d defining a hole 42f at its lower end.

A protrusion 16ea is formed to protrude to the left in the recess 16e formed at the left side face 16b in the top face 16c, and the fixing member 42 is disposed for rotation around the protrusion 16da by fitting the hole 42f of the fixing member 42 over the protrusion 16ea.

As illustrated in FIG. 4(a) and FIG. 5(b), the fixing member 42 is accommodated in the recess 16e when in a horizontal position, illustrated as dotted lines in FIG. 5(b), and is brought into a vertical position, illustrated as a solid line in FIG. 5(b), when rotated in the direction of arrow B around the protrusion 16ea.

Figure 6:
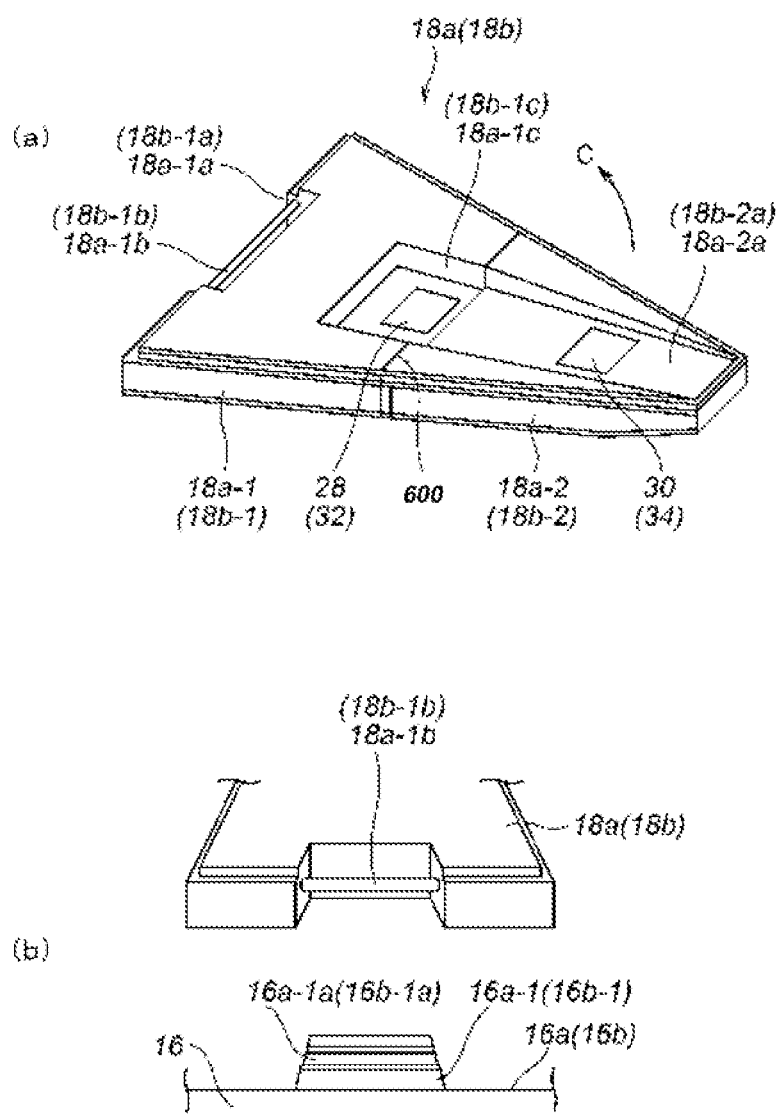

FIG. 6 illustrates a configuration of a side member according to an embodiment of the present invention.

As illustrated in FIG. 6, the side member 18a includes a base portion 18a-1 and a top portion 18a-2. The base portion 18a-1 and the top portion 18a-2 are connected to each other in such a manner that the top portion 18a-2 can be folded in the direction of arrow C at the connecting portion 600 between the base portion 18a-1 and the top portion 18a-2 (FIG. 6(a)).

The base portion 18a-1 has a cutout portion 18a-1a, and a rod-like engaging member 18a-1b is provided in the cutout portion 18a-1a. Furthermore, the base portion 18a-1 has a recess 18a-1c extending from its generally intermediate portion to the connecting portion between the base portion 18a-1 and the top portion 18a-2. The top portion 18a-2 has a recess 18a-2a extending from the connecting portion between the base portion 18a-1 and the top portion 18a-2 to its opposite end. In addition, a magnet 28 is disposed in the recess 18a-1c of the base portion 18a-1, and a magnet 30 is also disposed in the recess 18a-2a of the top portion 18a-2.

The side member 18a described above is rotatably engaged by fitting the engaging member 18a-1b into the groove 16a-1b of the connecting portion 16a-1 provided on the right side face 16a of the base member 16 (FIG. 6(b)). The side member 18b includes a base portion 18b-1 and a top portion 18b-2. The base portion 18b-1 and the top portion 18b-2 are connected to each other in such a manner that the top portion 18b-2 can be folded in the direction of arrow C at the connecting portion 600 between the base portion 18b-1 and the top portion 18b-2 FIG. 6(a)).

The base portion 18b-1 has a cutout portion 18b-1a which is provided with a rod-like engaging member 18b-1b. Additionally, the base portion 18b-1 has a recess 18b-1c extending from its intermediate portion to the connecting portion between the base portion 18b-1 and the top portion 18b-2. The top portion 18b-2 has a recess 18b-2a extending from the connecting portion between the base portion 18b-1 and the top portion 18b-2 to its opposite end. In addition, a magnet 32 is disposed in the recess 18b-1c of the base portion 18b-1, and a magnet 34 is also disposed in the recess 18b-2a of the top portion 18b-2.

The side member 18b constituted as described above is rotatably engaged by fitting the engaging member 18b-1b into the groove 16b-1b of the connecting portion 16b-1 provided on the left side face 16b of the base member 16 (FIG. 6(b)). The side members 18a and 18b can be brought into a horizontal position (FIG. 3(a)) and may also be brought into a horizontal position with the top portions 18a-2 and 18b-2 folded (FIG. 3(b)). In addition, as illustrated in FIG. 2, the side members 18a and 18b can be brought into a vertical position when rotated around the engaging members 18a-1b and 18b-1b. The side members 18a and 18b can be maintained in the vertical position since the magnets 28, 30, 32, and 34 attract the metal plates provided on the head portion accommodating member 20.

Figure 7:
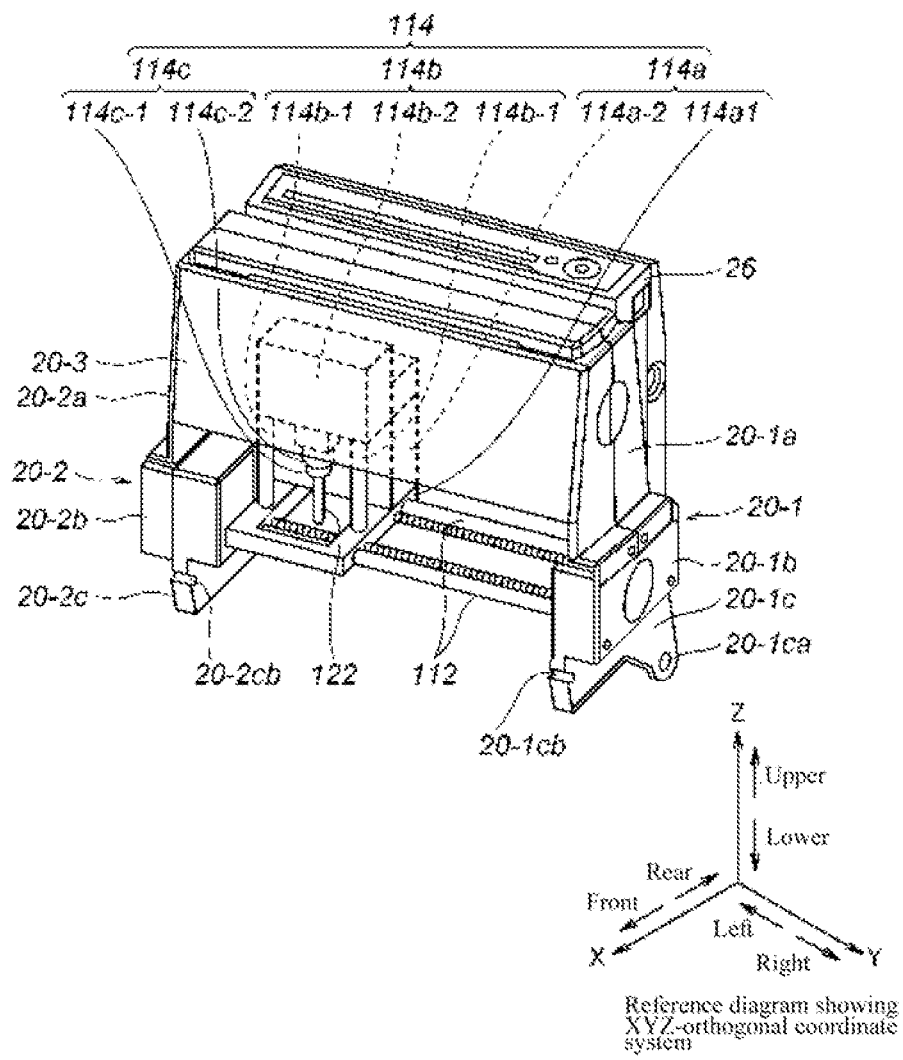
FIG. 7 and FIG. 8 illustrate a head portion accommodating member according to an embodiment of the present invention.

FIG. 7 illustrates a configuration of the head portion accommodating member according to an embodiment of the present invention. As illustrated in FIG. 7, the head portion accommodating member 20 includes side members 20-1 and 20-2, an upper member 20-3 connecting the side members 20-1 at an upper portion 20-1a and connecting the side members 20-2 an upper portion 20-2a.

As illustrated in FIG. 7, guide rails 112 connecting an intermediate portion 20-1b with an intermediate portion 20-2b are disposed between the side members 20-1 and 20-2. The head portion 114 supporting the tool 122 is slidably mounted on the guide rails 112.

The upper member 20-3 has a hollow body and a part of the head portion 114 mounted on the guide rails 112 is located in the upper member 20-3. Because the head portion 114 has the same configuration as that of the processing machine 100 according to the prior art previously described, it will not described in detail.

Figure 8:
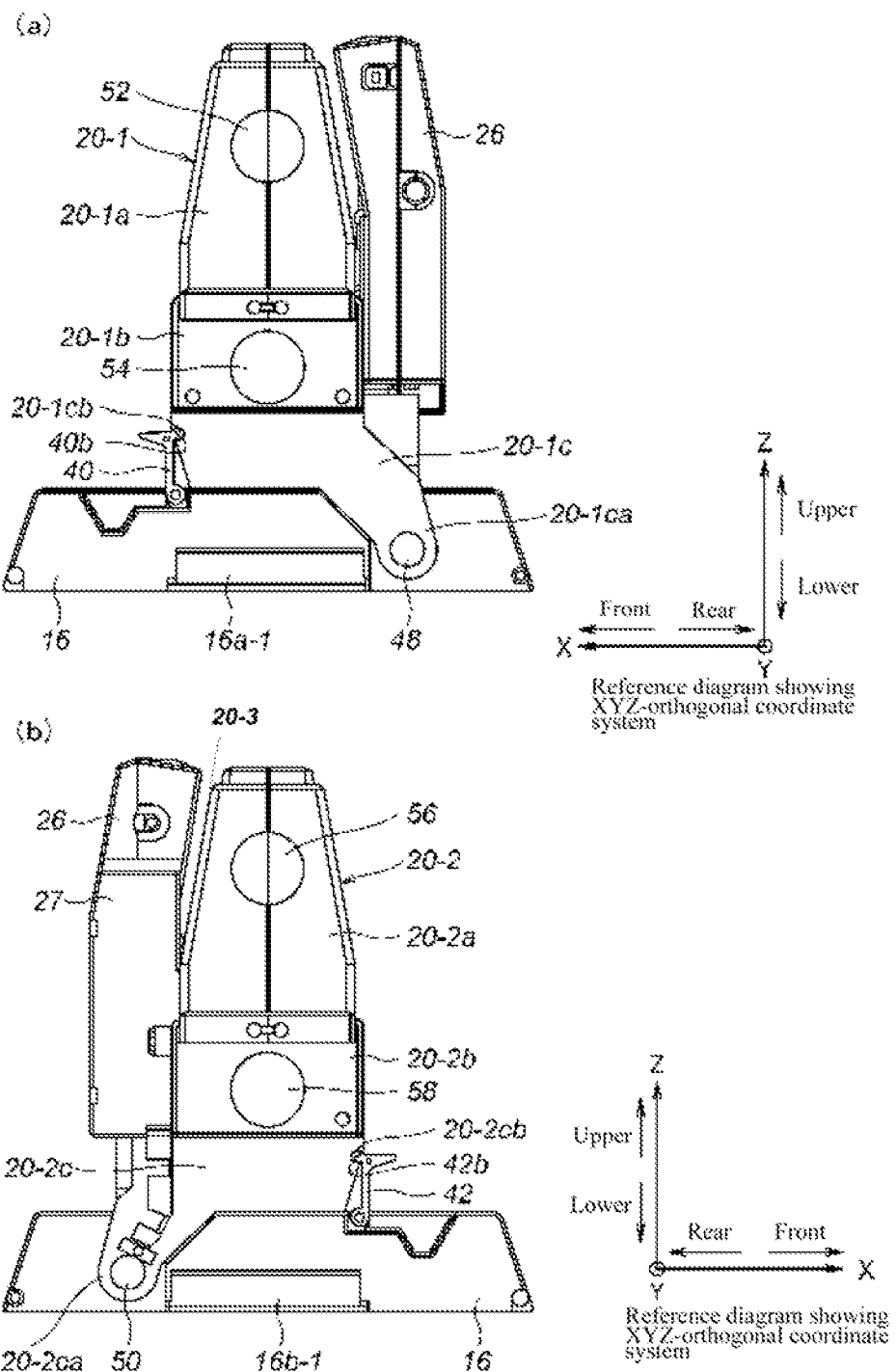

FIG. 8 illustrates the processing machine according to an embodiment of the present invention. As illustrated in FIG. 8, a connector 27 is provided behind the upper member 20-3, and the upper member 20-3 is removably connected to the connector 27. The control part 26 is connected via the connector 27 to the head portion 114, the movement mechanism for moving the table 104, and the like (not shown). The control part 26 performs various control functions, such as controlling the cutting conditions, including the spindle speed of the tool 122 or the movement of the table 104 and the tool 122, for example.

Additionally, the head portion accommodating member 20 is connected at a lower rear end portion 20-1ca to the base member 16 by a fixing member 48. The head portion accommodating member 20 is also connected at a lower rear end portion 20-2ca to the base member 16 by a fixing member 50 (FIGS. 8(a) and 8(b)).

In this example, the fixing member 48 and the fixing member 50 are located on the same plane in the Y-axis direction, and the head portion accommodating member 20 may be rotated around the fixing member 48 and the fixing member 50. In other words, the head portion accommodating member 20 with a gate-like shape is disposed in such a manner that a pair of leg portions thereof are in contact with the right side face 16a and the left side face 16b of the base member 16 with the base member 16 sandwiched there between.

In addition, the side member 20-1 has a recess 20-1cb, such that, a front protrusion 40b of the fixing member 40 may be engaged with the recess 20-1cb (FIG. 8(a)). Additionally, the side member 20-2 has a recess 20-2cb, such that, a front protrusion 42b of the fixing member 42 may be engaged with the recess 20-2cb (FIG. 8(b)). Accordingly, when the front protrusion 40b of the fixing member 40 is engaged with the recess 20-1cb and the front protrusion 42b of the fixing member 42 is engaged with the recess 20-2cb, the head portion accommodating member 20 is fixed in its vertical position.

As illustrated in FIG. 8(a), the side member 20-1 is provided with a disk-shaped metal plate 52 on the upper portion 20-1a and a disk-shaped metal plate 54 on the intermediate portion 20-1b. The metal plates 52 and 54 are provided at positions where they may be attracted by the magnets 30 and 28, respectively, when the side member 18a is in the vertical position.

As illustrated in FIG. 8(b), the side member 20-2 is provided with a disk-shaped metal plate 56 on the upper portion 20-2a and a disk-shaped metal plate 58 is provided on the intermediate portion 20-2b. The metal plates 56 and 58 are provided at positions where they may be attracted by the magnets 34 and 32, respectively, provided on the side member 18b when the side member 18b is in the vertical position.

Therefore, the head portion accommodating member 20 can be brought into a horizontal position (FIG. 3(b)) or a vertical position when rotated around the fixing members 48 and 50 (FIG. 3(a)). The head portion accommodating member 20 brought into the vertical position is maintained in the vertical position when the fixing members 40 and 42 are engaged with the recesses 20-1cb and 20-2cb, respectively.

Figure 9:
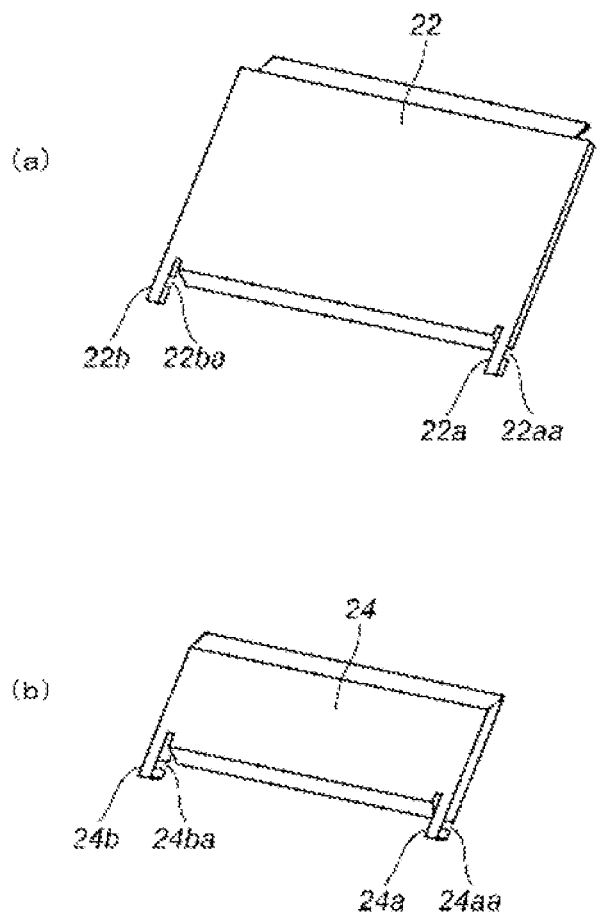
FIG. 9 illustrates a cover member of the processing machine according to an embodiment of the present invention.

FIG. 9 illustrates the front cover member and rear cover member of the processing machine according to an embodiment of the present invention. As illustrated in FIG. 9(a), the front cover member 22 has a generally plate-like shape with lower right end portion 22a and lower left end portion 22b protruding therefrom. The lower right end portion 22a has a cutout portion 22aa, and the lower left end portion 22b has a cutout portion 22ba (FIG. 9(a)).

The cutout portion 22aa is engaged with the protrusion 16a-2 provided at a front part of the right side face 16a of the base member 16 and the cutout portion 22ba is engaged with the protrusion 16b-2 provided at a front part of the left side face 16b of the base member 16, whereby the front cover member 22 is removably attached to the base member 16 for rotation around the protrusion 16a-2 and the protrusion 16b-2.

Therefore, the front cover member 22 can be brought into a horizontal position (FIG. 3(a)), and can be maintained in a vertical position (FIG. 2(a)) when leaned against a front face 18aa of the side member 18a and a front face 18ba of the side member 18b when the side members 18a and 18b and the head portion accommodating member 20 are in their vertical position.

As illustrated in FIG. 9(b), cover member 24 has a generally plate-like shape with a lower right end portion 24a and a lower left end portion 24b protruding therefrom. The lower right end portion 24a has a cutout portion 24aa, and the lower left end portion 24b has a cutout portion 24ba.

The cutout portion 24aa is engaged with the protrusion 16a-3 provided at a rear part of the right side face 16a of the base member 16 and the cutout portion 24ba is engaged with the protrusion 16b-3 provided at a rear part of the left side face 16b of the base member 16, whereby the rear cover member 24 is removably attached to the base member 16 for rotation around the protrusion 16a-3 and the protrusion 16b-3.

Therefore, the rear cover member 24 can be brought into a horizontal position (FIG. 3(a)), and can be brought into a vertical position when rotated around the protrusions 16a-3 and 16b-3 of the base member 16. The rear cover member 24 can be maintained in the vertical position when leaned against a rear face 18ab of the side member 18a and a rear face 18bb of the side member 18b when the side members 18a and 18b and the head portion accommodating member 20 are in their vertical position (FIG. 2(b)).

In the above configuration, when a workpiece is processed with the processing machine 10, the front cover member 22, the rear cover member 24, the side member 18a, and the side member 18b of the processing machine 10 are in the usage state (FIGS. 2(a) and 2(b)). The top portion 18a-2 of the side member 18a and the top portion 18b-2 of the side member 18b may then be folded, and the fixing members 40 and 42 may be accommodated into the recesses 16d and 16e, respectively. After the fixing members 40 and 42 are accommodated, the head portion accommodating member 20 is pulled down rearward.

Accordingly, the processing machine would be in an open state by pulling down the head portion accommodating member 20, the side members 18a and 18b, the front cover member 22 and the rear cover member 24.

Next, the workpiece 102 may be placed on the table 104 provided on the base member 16. Once the piece is set, after the head portion accommodating member 20 is brought into the vertical position, the fixing member 40 is brought into the vertical position to engage the front protrusion 40b of the fixing member 40 with the recess 20-1cb and the fixing member 42 is brought into the vertical position to engage the front protrusion 42b in order to maintain the head portion accommodating member 20 in the vertical position.

After the head portion accommodating member 20 is fixed in the vertical position, the top portion 18a-2 of the side member 18a is unfolded and then the side member 18a is brought into the vertical position to allow the metal plates 52 and 54 to be attracted by the magnets 30 and 28, respectively. Accordingly, the side member 18a is attracted by the head portion accommodating member 20 into the vertical position. Similarly, the top portion 18b-2 of the side member 18b is unfolded and then the side member 18b is brought into the vertical position to allow the metal plates 56 and 58 provided on the head portion accommodating member 20 to be attracted by the magnets 34 and 32, respectively. Thus, the side member 18b is attracted by the head portion accommodating member 20 into the vertical position.

Thereafter, the front cover member 22 is brought into the vertical position by leaning against the front face 18aa of and the front face 18ba. The rear cover member 24 is brought into the vertical position by leaning against the rear face 18ab and the rear face 18bb.

After the processing machine 10 is brought into the usage state again, a cutting operation on the workpiece 102 with the tool 122 is performed. During the cutting operation, the operator may visually monitor the cutting operation through the front cover member 22 or the rear cover member 24. When the cutting operation is completed, the operator pulls down the front cover member 22, the rear cover member 24, the side members 18a and 18b and the head portion accommodating member 20 to bring the processing machine 10 into the open state.

As previously described, the processing machine 10 according to the present invention can be brought into an open state by pulling down the side members 18a and 18b, the head portion accommodating member 20, the front cover member 22 and the rear cover member 24 into their respective horizontal positions. This enables inserting the tool 122 into a main spindle 114c and placing the workpiece on the table 104.

The present invention is not limited to the embodiments described above. Accordingly, the present invention may be modified as required.

For example, in the embodiments described above, the head portion accommodating member 20, the side members 18a and 18b, the front cover member 22, and the rear cover member 24 are arranged around the base member 16 such that the cutting debris generated during the cutting operation cannot be scattered or the tool 122 cannot be touched during a cutting operation.

However, according to another embodiment, only the head portion accommodating member 20 may be attached to the base member 16 or the base member 16 may be equipped only with the head portion accommodating member 20 and the side members 18a and 18b without the front cover member 22 and the rear cover member 24.

In the embodiments described above, the base member 16, the side members 18a and 18b and the head portion accommodating member 20 can be made of a resin, for example, although not specifically stated, the material of each constituent member may be suitably selected as appropriate.

In the embodiments described above, the side members 18a and 18b are disposed for rotation around the engaging members 18a-1b and 18b-1b, respectively, by engaging the engaging members 18a-1b and 18b-1b of the side members 18a and 18b with the grooves 16a-1b and 16b-1b of the connecting portions 16a-1 and 16b-1 with a generally rectangular solid shape. However, the embodiments of the present invention are not limited to this configuration and alternate configurations may be employed as long as the side members 18a and 18b can be rotated relative to the base member 16 between the horizontal and vertical positions.

In the embodiments described above, the front protrusions 40b and 42b of the fixing members 40 and 42 are engaged with the recess 20-1cb and 20-2cb, respectively, of the head portion accommodating member 20 to fix and maintain the head portion accommodating member 20 in the vertical position. However, the embodiments of present invention are not limited to this configuration.

For example, the head portion accommodating member 20 may be fixed and maintained in the vertical position by providing magnets on bottom faces 20-1cc and 20-2cc of the lower portions 20-1c and 20-2c of the side members 20-1 and 20-2 of the head portion accommodating member 20 and providing metal plates or magnets at positions where the magnets abut against the top face 16c of the base member 16 when the head portion accommodating member 20 is in the vertical position. In other words, various configurations may be employed as long as the head portion accommodating member 20 can be fixed on the base member 16 as necessary.

The embodiments described above may be combined as appropriate. Additionally, foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A processing machine for cutting a workpiece with a tool, the processing machine comprising:
   a base member configured to support a table for receiving the workpiece; and
   a tool support means including a tool spindle configured for rotating the tool about a spindle axis to perform the cutting of the workpiece, the tool support means disposed on the base member for rotation relative to the base member between a vertical position wherein the spindle axis is vertical and a horizontal position wherein the spindle axis is horizontal and configured to support the tool,
   wherein the tool support means is formed from a right leg portion, a left leg portion, wherein right and left are with respect to right and left sides of the processing machine when the processing machine is viewed from a front side thereof, wherein the tool support means is also formed from a main portion, such that the main portion connects an upper end of the right leg portion to an upper end of the left leg portion when the tool support means is in the vertical position,
   wherein the main portion is located above the table such that a space directly above the table is covered by the main portion when the tool support means is in the vertical position, and
   wherein the rotation of the tool support means from the vertical position to the horizontal position results in the space directly above the table not being covered by the main portion;
   wherein the processing machine also comprises:
      a left side cover member that is rotatably attached to a left side of the base so as to be rotatable between a horizontal position wherein a major plane of the left side cover member extends horizontally, and a vertical position wherein the major plane of the left side cover member extends vertically;
      a right side cover member that is rotatably attached to a right side of the base so as to be rotatable between a horizontal position wherein a major plane of the right side cover member extends horizontally, and a vertical position wherein the major plane of the right side cover member extends vertically;
   wherein when the left side cover member is in the vertical position, the left side cover member is magnetically attracted to a left end of the main portion, and when the right side cover member is in the vertical position, the right side cover member is magnetically attracted to a right end of the main portion.

2. The processing machine according to claim 1, wherein the table is configured to be movable in an X-direction of an XYZ-orthogonal coordinate system,
   wherein the tool is supported by the tool support means for movement in a Y-direction of the XYZ-orthogonal coordinate system and a Z-direction of the XYZ-orthogonal coordinate system, and
   wherein the tool support means is disposed such that the right leg portion and the left leg portion are disposed in contact with opposite side faces of the base member.

3. The processing machine according to claim 2, wherein the right side cover member and the left side cover member are provided on the opposite side faces of the base member for rotation between the respective vertical position thereof and the respective horizontal position thereof.

4. The processing machine according to claim 3, wherein the right side cover member and the left side cover member are provided on the side faces of the base member with which the, respective, right leg portion and the left leg portion of the tool support means are disposed in contact.

5. The processing machine according to claim 4, wherein the right side cover member and the left side cover member are foldable.

6. The processing machine according claim 5, wherein the right side cover member and the left side cover member are removably attached to the base member.

7. The processing machine according to claim 5, further comprising a pair of cover members, wherein one cover member of the pair of cover members is attachable to and removable from a front side face of the base member and the other cover member of the pair of cover members is attachable to and removable from a rear side face of the base member.

8. The processing machine according to claim 5, further comprising a fixing member provided on the base member for rotation between a vertical position wherein a longitudinal axis of the fixing member is vertical, and a horizontal position wherein the longitudinal axis of the fixing member is horizontal, wherein the fixing member is for maintaining the tool support means in the vertical position when the tool support means is in the vertical position.

9. The processing machine according claim 4, wherein the right side cover member and the left side cover member are removably attached to the base member.

10. The processing machine according to claim 4, further comprising a pair of cover members, wherein one cover member of the pair of cover members is attachable to and removable from a front side face of the base member and the other cover member of the pair of cover members is attachable to and removable from a rear side face of the base member.

11. The processing machine according to claim 4, further comprising a fixing member provided on the base member for rotation between a vertical position wherein a longitudinal axis of the fixing member is vertical, and a horizontal position wherein the longitudinal axis of the fixing member is horizontal, wherein the fixing member is for maintaining the tool support means in the vertical position when the tool support means is in the vertical position.

12. The processing machine according claim 3, wherein the right cover side member and the left side cover member are removably attached to the base member.

13. The processing machine according to claim 12, further comprising a pair of cover members, wherein one cover member of the pair of cover members is attachable to and removable from a front side face of the base member and the other cover member of the pair of cover members is attachable to and removable from a rear side face of the base member.

14. The processing machine according to claim 12, further comprising a fixing member provided on the base member for rotation between a vertical position wherein a longitudinal axis of the fixing member is vertical, and a horizontal position wherein the longitudinal axis of the fixing member is horizontal, wherein the fixing member is for maintaining the tool support means in the vertical position when the tool support means is in the vertical position.

15. The processing machine according to claim 3, further comprising a pair of cover members, wherein one cover member of the pair of cover members is attachable to and removable from a front side face of the base member and the other cover member of the pair of cover members is attachable to and removable from a rear side face of the base member.

16. The processing machine according to claim 15, further comprising a fixing member provided on the base member for rotation between a vertical position wherein a longitudinal axis of the fixing member is vertical, and a horizontal position wherein the longitudinal axis of the fixing member is horizontal, wherein the fixing member is for maintaining the tool support means in the vertical position when the tool support means is in the vertical position.

17. The processing machine according to claim 3, wherein the right side cover member and the left side cover member are foldable.

18. The processing machine according to claim 3, further comprising a fixing member provided on the base member for rotation between a vertical position wherein a longitudinal axis of the fixing member is vertical, and a horizontal position wherein the longitudinal axis of the fixing member is horizontal, wherein the fixing member is for maintaining the tool support means in the vertical position when the tool support means is in the vertical position.

19. The processing machine according to claim 2, further comprising a fixing member provided on the base member for rotation between a vertical position wherein a longitudinal axis of the fixing member is vertical, and a horizontal position wherein the longitudinal axis of the fixing member is horizontal, wherein the fixing member is for maintaining the tool support means in the vertical position when the tool support means is in the vertical position.

20. The processing machine according to claim 1, further comprising a fixing member provided on the base member for rotation between a vertical position wherein a longitudinal axis of the fixing member is vertical, and a horizontal position wherein the longitudinal axis of the fixing member is horizontal, wherein the fixing member is for maintaining the tool support means in the vertical position when the tool support means is in the vertical position.

21. The processing machine according to claim 20, wherein the fixing member is rotatably attached to the base member by a ring portion formed at a lower end of the fixing member and has a protrusion formed at an upper end thereof and engageable with one of the right leg portion or the left leg portion to maintain the tool support means in the vertical position when the tool support means is in the vertical position.

22. A processing machine for cutting a workpiece with a tool, the processing machine comprising:
  a base member configured to support a table for receiving the workpiece; and
  a tool support means including a tool spindle configured for rotating the tool about a spindle axis to perform the cutting of the workpiece, the tool support means disposed on the base member for rotation relative to the base member between a vertical position wherein the spindle axis is vertical and a horizontal position wherein the spindle axis is horizontal and configured to support the tool,
  wherein the tool support means is formed from a right leg portion, a left leg portion, wherein right and left are with respect to right and left sides of the processing machine when the processing machine is viewed from a front side thereof, wherein the tool support means is also formed from a main portion, such that the main portion connects an upper end of the right leg portion to an upper end of the left leg portion when the tool support means is in the vertical position,
  wherein the main portion is located above the table such that a space directly above the table is covered by the main portion when the tool support means is in the vertical position, and
  wherein the rotation of the tool support means from the vertical position to the horizontal position results in the space directly above the table not being covered by the main portion wherein the processing machine also comprises:
- a left side cover member that is rotatably attached to a left side of the base so as to be rotatable between a horizontal position wherein a major plane of the left side cover member extends horizontally, and a vertical position wherein the major plane of the left side cover member extends vertically;
- a right side cover member that is rotatably attached to a right side of the base so as to be rotatable between a horizontal position wherein a major plane of the right side cover member extends horizontally, and a vertical position wherein the major plane of the right side cover member extends vertically;
- a front cover member rotatably attached to a front side of the base;
- a rear cover member rotatably attached to a rear side of the base;

wherein when the left side cover member is in the vertical position thereof and when the right side cover member is in the vertical position thereof, the front cover member can be rotated to a position wherein the front cover member is leaned against a front face of the left side cover member and against a front face of the right side cover member, and the rear cover member can be rotated to a position wherein the rear cover member is leaned against a rear face of the left side cover member and against a rear face of the right side cover member.

* * * * *